United States Patent [19]

Okuno et al.

[11] Patent Number: 5,079,313

[45] Date of Patent: Jan. 7, 1992

[54] POLYMER DISPERSING AGENT AND EPOXY RESIN COMPOSITION

[75] Inventors: Tatsuya Okuno; Hiromu Okamoto, both of Otsu; Masahiro Uemori, Takatsuki, all of Japan

[73] Assignee: Sunstar Giken Kabushiki Kaisha, Osaka, Japan

[21] Appl. No.: 436,710

[22] Filed: Nov. 15, 1989

[30] Foreign Application Priority Data

Nov. 16, 1988 [JP] Japan ................................ 63-290931
Apr. 12, 1989 [JP] Japan .................................... 1-92635

[51] Int. Cl.$^5$ .......................................... C08F 283/00
[52] U.S. Cl. ..................................... 525/487; 522/144; 522/149; 522/172; 528/26; 528/30; 525/523
[58] Field of Search ....................... 522/172, 144, 149; 528/26, 30; 525/487, 523

[56] References Cited

U.S. PATENT DOCUMENTS 4,268,655 5/1981 Homan et al. ...................... 528/30
4,923,912 5/1990 Sasaki et al. ....................... 525/487

*Primary Examiner*—Melvyn I. Marquis
*Attorney, Agent, or Firm*—Wegner, Cantor, Mueller & Player

[57] ABSTRACT

Polymer dispersing agent comprising a graft polymer prepared by graft-polymerizing an organopolysiloxane having a mercapto group on the side chain with at least one acrylic or methacrylic monomer, and epoxy resin composition comprising epoxy resin, silicone resin and the above polymer dispersing agent. The polymer dispersing agent has an excellent effect for dispersing the silicone resin into the epoxy resin, and thereby the epoxy resin composition thus prepared has high dispersion stability and exhibits improved impact resistance and relaxation of residual internal stress and is useful as a sealing agent for IC, a coating agent, a paint composition, an adhesive, and a prepreg.

16 Claims, No Drawings

POLYMER DISPERSING AGENT AND EPOXY RESIN COMPOSITION

This invention relates to a polymer dispersing agent and an epoxy resin composition containing the polymer dispersion. More particularly, it relates to a polymer dispersing agent comprising an organopolysiloxane having a mercapto group on the side chain which is grafted with an acrylic or methacrylic polymer chain, and an epoxy resin composition comprising an epoxy resin matrix wherein silicone resin particles ar stably dispersed by using the above polymer dispersion. Said epoxy resin composition shows improved impact resistance and improved relaxation of residual internal stress.

Prior Art

Various epoxy resin compositions have been used in various fields such as a coating agent, a paint composition, an adhesive, a prepreg, and the like. However, the epoxy resin compositions are usually inferior in impact resistance when cured and have residual internal stress. There has been proposed an epoxy resin composition prepared by incorporating a silicone resin with an epoxy resin in order to improve the properties such as impact resistance and residual internal stress of the epoxy resin (cf. U.S. Pat. No. 4,851,481). However, since these two components are substantially incompatible with each other, a silicone oligomer is usually added to the composition as a dispersing agent, and the dispersing agent has to have a group being compatible with the epoxy resin in order to maintain the dispersion stably. Besides, the silicone resin includes an oily organosiloxane or a product crosslinked with an oily organosiloxane, but these silicone resins are limited in use. Moreover, oily or solid silicone resin particles tend to increase their particle size within the matrix with lapse of time. In addition, when the epoxy resin composition is cured in use, the particle size of the dispersion varies according to the curing conditions, i.e. the particle size between that before the curing and after the curing varies, particularly when curing at a high temperature, the variation of the particle size is larger, which is an additional problem.

BRIEF DESCRIPTION OF THE INVENTION

The present inventors have intensively studied as to an improved epoxy resin composition for eliminating the above-mentioned problems in the conventional composition, and as a result, have found that a suitable dispersing agent is an organopolysiloxane having a mercapto group on the side chain which is grafted with an acrylic or methacrylic polymer chain being compatible with the epoxy resin, that is, when the specific grafted organopolysiloxane is used as the dispersing agent, various kinds of silicone resins can stably be dispersed in the epoxy resin without limitation.

An object of the invention is to provide an improved polymer dispersing agent comprising a specific grafted organopolysiloxane suitable for dispersing a silicone resin into an epoxy resin to give an epoxy resin composition having improved properties. Another object of the invention is to provide a stable epoxy resin composition having improved properties such as excellent impact resistance and decreased residual internal stress. These and other objects and advantages of the invention will be apparent to those skilled in the art from the following description.

DETAILED DESCRIPTION OF THE INVENTION

The polymer dispersing agent of this invention comprises a graft polymer prepared by graft-polymerizing an organopolysiloxane having a mercapto group on the side chain of the formula:

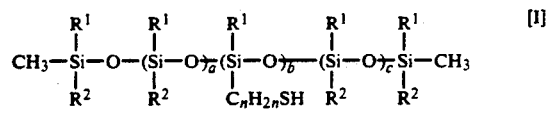

wherein $R^1$ and $R^2$ are the same or different and are each $CH_3$ or phenyl group, n is an integer of from 0 to 4, a and c are each 0 or an integer of 1 or more, b is an integer of 1 or more, and $a+b+c=1$ to 250, preferably 100 to 200, with at least one acrylic or methacrylic monomer (hereinafter, abbreviated as "(meth)acrylic monomer") of the formula:

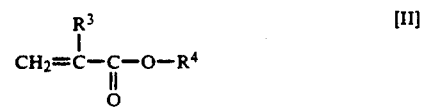

wherein $R^3$ is H or $CH_3$, and $R^4$ is a group of the formula:

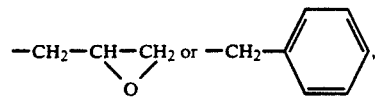

or an alkyl group having 1 to 4 carbon atoms.

This invention provides also an epoxy resin composition comprising an epoxy resin, a silicone resin and the polymer dispersing agent as mentioned above, wherein the epoxy resin and the silicone resin are contained in a ratio of 40:60 to 95:5 by weight, and the polymer dispersing agent is incorporated in an amount of 1 to 10 parts by weight to 100 parts by weight of the total weight of the epoxy resin and the silicone resin.

The organopolysiloxane having a mercapto group on the side chain of the formula [I] (hereinafter, referred to merely as "mercaptopolysiloxane") has usually a mercapto equivalent of 3,300 to 33,000 and includes a commercially available BY-838, BX16-838A and BX16-837 (manufactured by Toray Silicone K.K., Japan).

The above (meth)acrylic monomer [II] to be grafted with the mercaptopolysiloxane includes, for example, methyl methacrylate, ethyl acrylate or methacrylate, benzyl methacrylate, butyl acrylate or methacrylate, glycidyl acrylate or methacrylate, and the like, which are used alone or in combination of two or more thereof.

The mercaptopolysiloxane and the (meth)acrylic monomer are used in a ratio of 1:10-20 by weight, preferably 1:15-20 by weight. When the (meth)acrylic monomer is used in an amount less than the above range, the obtained polymer can not exhibit the desired dispersing effect, and on the other hand, when it is used in an amount larger than the above range, the polymer has increased molecular weight which results in less solubility in a solvent and tends disadvantageously to occurrence of gelation.

The polymer dispersing agent of this invention comprises a novel graft polymer prepared by graft-polymerization of the above mercaptopolysiloxane [I] and the (meth)acrylic monomer [II] optionally in a suitable organic solvent (e.g. benzene, chloroform, dichloromethane, tetrahydrofuran (THF), dimethylformamide (DMF), etc.). It is assumed that this graft polymer has the following formula:

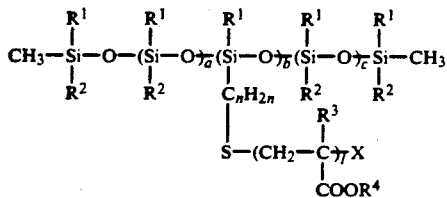

wherein X is a group of the formula:

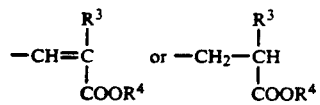

l is 1 to 100, and $R^1$, $R^2$, $R^3$, $R^4$, n, a, b, and c are as defined above.

The graft-polymerization is carried out by a conventional method, for example, by photopolymerization with ultraviolet irradiation using a high-voltage mercury-vapor lamp under nitrogen gas, or by thermal polymerization, by which there is obtained the graft polymer being colorless clear or white solid. In the polymerization, an azo compound (e.g. azobisisobutyronitrile (AIBN), azobiscyclohexanenitrile, etc.) may optionally be used as a polymerization initiator in an amount of 0.5 to 3 parts by weight to 100 parts by weight of the (meth)acrylic monomer [II].

The epoxy resin used in this invention may be conventional epoxy resins. Suitable examples of the epoxy resin are as follows, which are used alone or in combination of two or more.

(1) Glycidylamine type epoxy resins

Epoxy resin having at least one N,N-glycidylamino group, such as N,N,N',N'-tetraglycidylaminodiphenylmethane, N,N-diglycidyl-meta(or para)aminophenol glycidyl ether, and condensation products thereof. Commercially available products are Araldite MY 720 (manufactured by Ciba-Geigy), Epotohto YH 434 and YH 120 (manufactured by Toto Kasei K.K.).

(2) Novolak type epoxy resins

Phenol novolak type epoxy resins. Commercially available products are Epikote 152 and 154 (manufactured by Shell Chemical), Dow Epoxy Resin DEN 431, 438, 439 and 485 (manufactured by Dow Chemical), Ciba-Geigy EPN 1138 and 1139 (manufactured by Ciba-Geigy).

Cresol novolak type epoxy resins. Commercially available products are Ciba-Geigy ECN 1235, 1273, 1280 and 1299 (manufactured by Ciba-Geigy), EOCN 102, 103 and 104 (manufactured by Nippon Kagaku Kogyo K.K.).

(3) Bisphenol A type epoxy resins

Commercially available products of bisphenol A type epoxy resins are Epikote 828, 834, 827, 1001, 1002, 1004, 1007, and 1009 (manufactured by Yuka Shell K.K.), Dow Epoxy DER 331, 332, 662, 663U, and 662U (manufactured by Dow Chemical), Araldite 6071, 7071, and 7072 (manufactured by Ciba-Geigy), Epiclon 840, 850, 855, 860, 1050, 3050, 4050, and 7050 (manufactured by Dainippon Ink Kagaku Kogyo K.K.), and the like.

Commercially available products of urethane-modified bisphenol A type epoxy resins are Adeka Resin EPV-6, EPV-9, and EPV-15 (manufactured by Asahi Denka K.K.).

Commercially available products of brominated bisphenol A type epoxy resins are Araldite 8011 (manufactured by Ciba-Geigy), Dow Epoxy Resin DER 511 (manufactured by Dow Chemical), and the like.

(4) Alicyclic epoxy resins

Commercially available products are Araldite CY-179, CY-178, CY-182, and CY-183 (manufactured by Ciba-Geigy).

(5) Other epoxy resins

Resorcine type, tetrahydroxyphenylethane type, polyalcohol type, polyglycol type, glycerin triether type, polyolefin type, epoxylated soybean oil, ester type epoxy resins.

When the epoxy resins are liquid at room temperature, they may be used as they stand, but when they are solid at room temperature, they are used after melting by heating or may be used after being liquefied in a liquid epoxy resin.

The silicone resin used in this invention includes oily organopolysiloxane or a solid product obtained by crosslinking the organopolysiloxane. The silicone resin is usually used in a ratio of epoxy resin:silicone resin of 40:60 to 95:5 by weight. When the silicone resin is used in an amount less than the above range, the desired improvement of the properties of the composition can not be achieved, and on the other hand, when the amount of the silicone resin is over the above range, the obtained resin disadvantageously becomes wholly gel-like.

The oily organopolysiloxane used in this invention includes organopolysiloxanes having a silanol group at both termini and having a number average molecular weight of 1,000 to 50,000, for example, polydimethylsiloxane having a silanol group at both termini, diphenylsiloxane having a silanol group at both termini, polydimethyl-diphenylsiloxane having a silanol group at both termini, polytetramethyl-p-silphenylenesiloxane, and the like.

The crosslinked silicone resin includes a resin prepared by crosslinking the above oily organopolysiloxane having a silanol group at both termini with a silane coupling agent having at least two alkoxysilyl groups within the molecule at a molar ratio of the alkoxy group to the hydroxy group of the above polysiloxane, i.e. [alkoxy]:[OH], of 0.1 to 15. The crosslinking reaction is usually carried out at room temperature or with heating, wherein a reaction catalyst (e.g. t-butyl tin oxide, lead octate, tin octate, tertiary amino compounds, water, etc.) may be used in order to promote the reaction.

The above silane coupling agent includes aminosilane compounds [e.g. γ-aminopropyltriethoxysilane, β-aminoethyltrimethoxysilane, γ-aminopropyldiethoxymethylsilane, γ-allylaminopropyltrimethoxysilane, β-(β-aminoethylthioethyl)diethoxymethylsilane, β-(β-aminoethylthioethyl)triethoxysilane, β-phenylaminopropyltrimethoxysilane, γ-cyclohexylaminopropyltrimethoxysilane, γ-benzylaminopropyltrimethoxysilane, γ-(vinylbenzylaminopropyl)triethoxysilane, N-β-

(aminoethyl)-γ-aminopropyltrimethoxysilane, N-β-(aminoethyl)-γ-aminopropylmethyldimethoxysilane, β-aminoethylaminomethyltrimethoxysilane, γ-[β-(β-aminoethylaminoethylamino)propyl]triethoxysilane, N-(3-triethoxysilylpropyl)urea, etc.]; mercaptosilane compounds [e.g. 3-mercaptopropylmethyldimethoxysilane, 3-mercaptopropyltriethoxysilane, mercaptomethyltrimethoxysilane, 3-mercaptopropyltrimethoxysilane, etc.]; epoxysilane compounds [e.g. β-(3,4-epoxycyclohenxyl)ethyltrimethoxysilane, [2-(3,4-epoxy-4-methylcyclohexyl)propyl] methyldiethoxysilane, (3-glycidoxypropyl)methyldiethoxysilane, 3-glycidoxypropyltrimethoxysilane, etc.]; isocyanatosilane compounds [e.g. γ-isocyanatopropyltriethoxysilane, γ-isocyanatopropyltrimethoxysilane, etc.], and the like.

The epoxy resin composition of this invention is prepared by adding the above polymer dispersing agent to a mixture of an epoxy resin and a silicone resin in a prescribed ratio as mentioned above, and mixing with stirring the mixture. In the composition, the silicone resin particles in a particle size of 0.4 to 1.0 μm are stably dispersed within the epoxy resin matrix. The dispersion particle size does not vary even after being kept at 80° C. for 7 days. The polymer dispersing agent is used in an amount of 1 to 10 parts by weight, preferably 2 to 5 parts by weight, to 100 parts by weight of the total weight of the epoxy resin and the silicone resin. When the dispersing agent is used in an amount less than 1 part by weight, the desired effect for dispersing the silicone resin can not be achieved, and on the other hand, when the amount of the dispersing agent is over 10 parts by weight, the dispersing effect is no more increased, and it rather disadvantageously results in bleeding of the dispersing agent and also in increase of cost.

The epoxy resin composition of this invention contains various silicone resin particles which are homogeneously dispersed within the epoxy resin matrix, and thereby, shows the desired improvement of properties of the epoxy resin composition, particularly improved impact resistance and relaxation of residual internal stress. The composition can be cured by a conventional curing agent used for epoxy resins.

The epoxy resin composition of this invention is useful as an IC sealing agent in view of its low dielectric constant, and also as coating agents, paint compositions, adhesives, prepregs in view of its excellent waterproof properties, high impact resistance, high flexibility.

This invention is illustrated by the following Examples but should not be construed to be limited thereto.

Example 1

Mercaptopolysiloxane [BX 16-838A, manufactured by Toray Silicone K.K., mercapto equivalent: 3,300, in the formula [I], $R^1$ is $CH_3$, $R^2$ is $CH_3$] (5 parts by weight) and methyl methacrylate (100 parts by weight) are subjected to photopolymerization by irradiating with a high-voltage mercury-vapor lamp in dichloromethane (100 parts by weight) at 5° C. for 2 hours. The reaction product is separated and purified with methanol to give a white solid graft polymer (polymerization yield 45%). By IR analysis, it is confirmed that the polymer has —COO— (1720 cm$^{-1}$) and —SiO— (1000-1100 cm$^{-1}$).

Example 2

The same mercaptopolysiloxane [mercapto equivalent: 3,300] as used in Example 1 (10 parts by weight) and benzyl methacrylate (100 parts by weight) are subjected to photopolymerization by irradiating with a high-voltage mercury-vapor lamp in dichloromethane (100 parts by weight) at 5° C. for 2.5 hours. The reaction product is separated and purified with methanol to give white solid graft polymer (polymerization yield 52%). By IR analysis, it is confirmed that the polymer has —COO— (1720 cm$^{-1}$) and —SiO— (1000-1100 cm$^{-1}$).

Example 3

Mercaptopolysiloxane [BX 16-838, manufactured by Toray Silicone K.K., mercapto equivalent: 33,000, in the formula [I], $R^1$ is $CH_3$, $R^2$ is $CH_3$] (10 parts by weight) and butyl methacrylate (50 parts by weight) are subjected to photopolymerization by irradiating with a high-voltage mercury-vapor lamp at 5° C. for 2 hours. The reaction product is separated and purified with methanol to give white solid graft polymer (polymerization yield 40%). By IR analysis, it is confirmed that the polymer has —COO— (1720 cm$^{-1}$) and —SiO— (1000-1100 cm$^{-1}$).

Example 4

The same mercaptopolysiloxane [mercapto equivalent: 33,000] as in Example 3 (10 parts by weight) and butyl acrylate (20 parts by weight) and methyl methacrylate (80 parts by weight) are subjected to photopolymerization in the presence of AIBN (1 part by weight) at 70° C. for 2 hours to give a white solid graft polymer (conversion rate 70%). By IR analysis, it is confirmed that the polymer has —COO— (1710 cm$^{-1}$) and —SiO— (1000-1100 cm$^{-1}$).

Example 5

(1) Epoxy resin composition

By using each graft polymer obtained in Examples 1 to 4 as a dispersing agent, there are prepared epoxy resin composition Nos. 1 to 4 having the components as shown in the following Table 1. The initial particle sizes (measured by a light microscope) of the dispersed resin particles in the compositions are also shown in Table 1.

TABLE 1

| Components | No. 1 | No. 2 | No. 3 | No. 4 |
|---|---|---|---|---|
| Epoxy resin *1 | 80 | 80 | 80 | 80 |
| Oily silicone resin *2 | 20 | 20 | 20 | 20 |
| Graft polymer sol. *3 | 20 | 20 | 20 | 20 |
| (Example No.) | (1) | (2) | (3) | (4) |
| Initial particle size (μm) | 0.4–0.6 | 0.5–0.9 | 0.4–0.8 | 0.8–1.0 |
| Particle size (μm) after stability test | 0.5–0.8 | 0.5–0.9 | 0.5–1.0 | 0.8–1.0 |

*1 Bisphenol A type epoxy resin (Epikote 828, manufactured by Yuka Shell K.K.)
*2 Organopolydimethylsiloxane having silanol group at both termini of the formula:

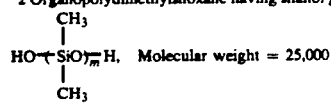

*3 10% solution in THF (2) Stability test

When each composition Nos. 1 to 4 was kept at 80° C. for 7 days, only few or no variations of the dispersed particle size was observed as is shown in the above Table 1.

Example 6

To bisphenol A type epoxy resin (Epikote 828, manufactured by Yuka Shell K.K.) (60 parts by weight) is added t-butyl tin oxide (0.5 part by weight). To the mixture are added an organopolymethylsiloxane having a terminal silanol group (molecular weight 25,000) (40 parts by weight), 3-glycidoxypropyltrimethoxysilane (as a crosslinking agent, 1 part by weight) and a 10% THF solution of the graft polymer obtained in Example 1 (as a dispersing agent, 20 parts by weight) with stirring at 80° C., and the mixture is stirred for 6 hours. The composition thus prepared is an epoxy resin composition which is a milky color oily substance, wherein the crosslinked silicone resin particles having a particle size of 0.5 to 1.5 μm are uniformly dispersed.

When the composition was kept at 80° C. for 7 days, the dispersed resin particles had a particle size of 0.5 to 1.5 μm, and thus, no variation of the particle size was observed.

What is claimed is:

1. A polymer dispersing agent which comprises a graft polymer of an organopolysiloxane having a mercapto group on the side chain of the formula:

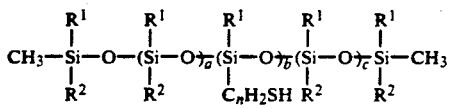

wherein $R^1$ and $R^2$ are the same or different and are each $CH_3$ or phenyl group, n is an integer of from 0 to 4, a and c are each 0 or an integer of 1 or more, b is an integer of 1 or more, and $a+b+c=1$ to 250, and at least one acrylic or methacrylic monomer of the formula:

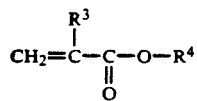

wherein $R^3$ is H or $CH_3$, and $R^4$ is a group of the formula:

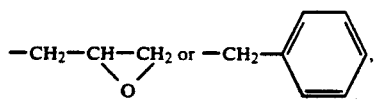

or an alkyl group having 1 to 4 carbon atoms.

2. The polymer dispersing agent according to claim 1, wherein the organopolysiloxane and the acrylic or methacrylic monomer are in a ratio of 1:10 to 20 by weight.

3. The polymer dispersing agent according to claim 2 wherein the weight ratio of the organopolysiloxane to the acrylic or methacrylic monomer is in the range of 1:15 to 20.

4. An epoxy resin composition which comprises an epoxy resin, a silicone resin and the polymer dispersing agent as set forth in claim 1, wherein the silicone resin is an oily organopolysiloxane or a crosslinked oily organopolysiloxane, and the epoxy resin and the silicone resin are in the ratio of 40:60 to 95:5 by weight and the polymer dispersing agent is in an amount of 1 to 10 parts by weight to 100 parts by weight of the total weight of the epoxy resin and the silicone resin.

5. The epoxy resin composition according to claim 4, wherein the silicone resin is in the form of particles which are homogeneously dispersed in the epoxy resin matrix and have a particle size of 0.4 to 1.0 μm.

6. The epoxy resin composition according to claim 4, wherein the polymer dispersing agent is in an amount of 2 to 5 parts by weight to 100 parts by weight of the total weight of the epoxy resin and the silicone resin.

7. The epoxy resin composition according to claim 4, wherein the epoxy resin is a glycidylamine epoxy resin, novolak epoxy resin, bisphenol-A epoxy resin, alicyclic epoxy resin, resorcin epoxy resin, tetrahydroxyphenylethane epoxy resin, polyalcohol epoxy resin, glycerin triether epoxy resin, polyolefin epoxy resin, epoxylated soybean oil epoxy resin or ester epoxy resin.

8. The epoxy resin composition according to claim 4, wherein the epoxy resin is selected from the group consisting of N,N,N', N'-tetraglycidylaminodiphenylmethane epoxy resin, N,N-diglycidyl-meta-aminophenol glycidyl ether epoxy resin, N,N-diglycidyl-para-aminophenol glycidyl ether epoxy resin and condensation products thereof.

9. The epoxy resin composition according to claim 4, wherein the epoxy resin is a phenol novolak resin or cresol novolak resin.

10. The epoxy resin composition according to claim 4, wherein the epoxy resin is selected from the group consisting of bisphenol A epoxy resins, urethane-modified bisphenol A epoxy resins, and brominated bisphenol A epoxy resins.

11. The epoxy resin composition according to claim 4, wherein the silicone resin is an oily organopolysiloxane having a silanol group at both termini and having a number average molecular weight of from 1,000 to 50,000.

12. The epoxy resin composition according to claim 4, wherein the silicone resin is a crosslinked oily organopolysiloxane prepared by crosslinking an oily organopolysiloxane having a silane coupling agent, said oily organopolysiloxane having a silanol group at both termini and having a number average molecular weight of from 1,000 to 50,000, and said silane coupling agent having at least two alkoxysilyl groups, at a 1.0:15 molar ratio of the alkoxy group to the hydroxy group of the oily organopolysiloxane.

13. The epoxy resin composition according to claim 12, wherein the silane coupling agent is an amino-silane, mercaptosilane, epoxysilane or isocyanatosilane compound.

14. The epoxy resin composition according to claim 4, wherein said organopolysiloxane having a mercapto group on the side chain is a mercaptopolysiloxane having a mercapto equivalent of from 3,300 to 33,000.

15. The polymer dispersing agent according to claim 1, wherein said organopolysiloxane having amercapto group on the side chain is a mercaptopolysiloxane having a mercapto equivalent of from 3,300 to 33,000.

16. The polymer dispersing agent according to claim 1, wherein said at least one acrylic or methacrylic monomer is selected from the group consisting of methyl methacrylate, ethyl acrylate, ethyl methacrylate, benzyl methacrylate, butyl acrylate, butyl methacrylate, glycidyl acrylate and glycidyl methacrylate.

* * * * *